Figure 1:
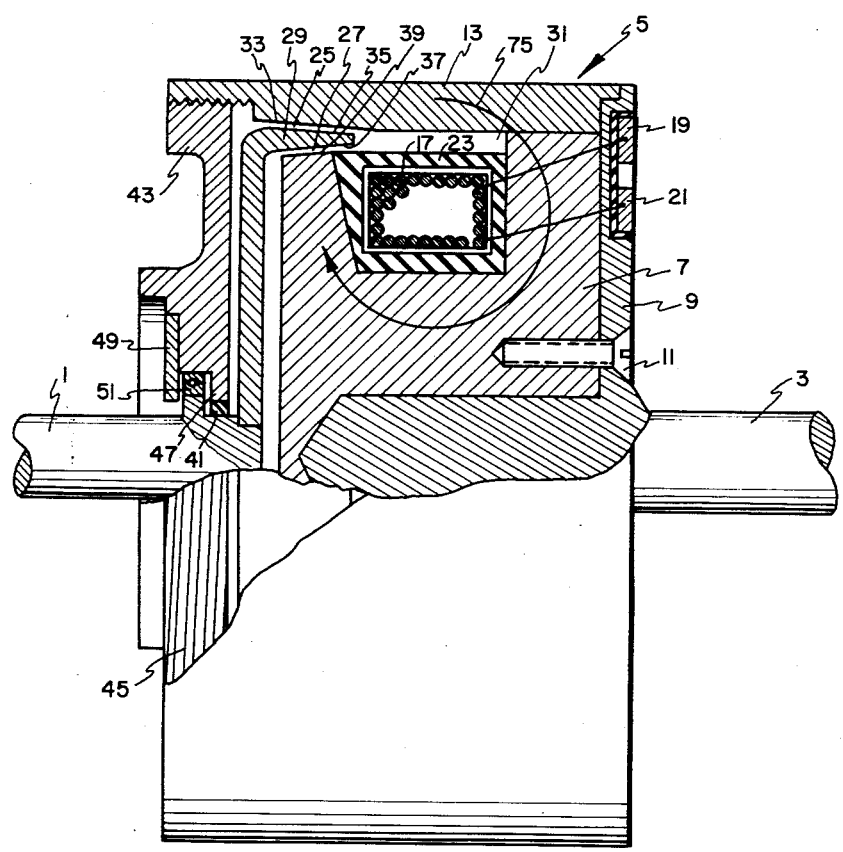

Sept. 26, 1961  A. P. IMPERI  3,001,619
MAGNETIC CLUTCH

Filed April 9, 1959  2 Sheets-Sheet 1

INVENTOR.
ALDO P. IMPERI

BY
Ernest L. Brown

Sept. 26, 1961  A. P. IMPERI  3,001,619
MAGNETIC CLUTCH

Filed April 9, 1959  2 Sheets-Sheet 2

INVENTOR.
ALDO P. IMPERI
BY
Ernest L. Brown

United States Patent Office 3,001,619
Patented Sept. 26, 1961

3,001,619
MAGNETIC CLUTCH
Aldo P. Imperi, Grand Rapids, Mich., assignor to Lear, Incorporated
Filed Apr. 9, 1959, Ser. No. 805,307
1 Claim. (Cl. 192—21.5)

This invention pertains to a magnetic clutch, and more particularly to a magnetic particle clutch which is adapted to be adjusted to give a predetermined torque vs. exciting current characteristics.

Magnetic particle clutches of various types have been devised to transmit a torque from one shaft to another. While these clutches may be designed to have various torque vs. exciting current characteristics, the device of this invention contemplates a means for adjustably setting a given clutch to a predetermined torque vs. exciting current characteristic within a given range of characteristics.

In clutches which are presently made, there is a large variation in torque vs. exciting current characteristics due to manufacturing tolerances. There is no practical means to vary the characteristic after the clutch is assembled.

Although the characteristic may be varied by changing to a different type or blend of particle powder, the amount of change in characteristic cannot be predicted accurately.

The torque vs. exciting current characteristic of a clutch can be reduced by machining the air gap, but predicting the performance of such a clutch accurately is impossible.

The gain or torque vs. exciting current characteristic of the clutch can be varied by varying the quantity of particle powder, which means using an overrated clutch and starving the air gap of powder. When the air gap is starved of particle powder, the clutch performance becomes inconsistent and the clutch becomes sensitive to attitude.

It is frequently desirable to adjust the components of a servo system to have a predetermined transfer characteristic to thereby achieve a predetermined result. Adjustment of the servo system is usually achieved by changing the electrical characteristics of a servo amplifier, or the like. It is, however, frequently desirable to utilize the same design of servo amplifier in system after system and to make adjustments of the servo transfer function by adjusting a mechanical link of the servo system. Adjustment in the mechanical apparatus is particularly desirable if the apparatus happens to be of a reliable type which maintains its calibration. The clutch contemplated by this invention is a torque transmitting device which is adapted to be adjusted to a predetermined torque vs. exciting current characteristic and which is particularly useful as a link in a servo system.

The device of this invention, therefore, contemplates a means for controlling the torque vs. exciting current characteristic by varying the reluctance of the magnetic flux path.

The specific embodiments set forth in this application show two means which have been found particularly useful in varying the air gap length within the flux path by the use of particular mechanisms, to thereby vary the reluctance of the flux path and the torque vs. exciting current characteristic.

It is, therefore, an object of this invention to provide an improved magnetic clutch.

It is another object of this invention to provide a magnetic clutch which has adjustable torque vs. exciting current characteristic.

It is still another object of this invention to provide a magetic particule clutch which has an adjustable member adapted to vary the slip-torque vs. exciting current characteristic of the clutch.

Figure 2:
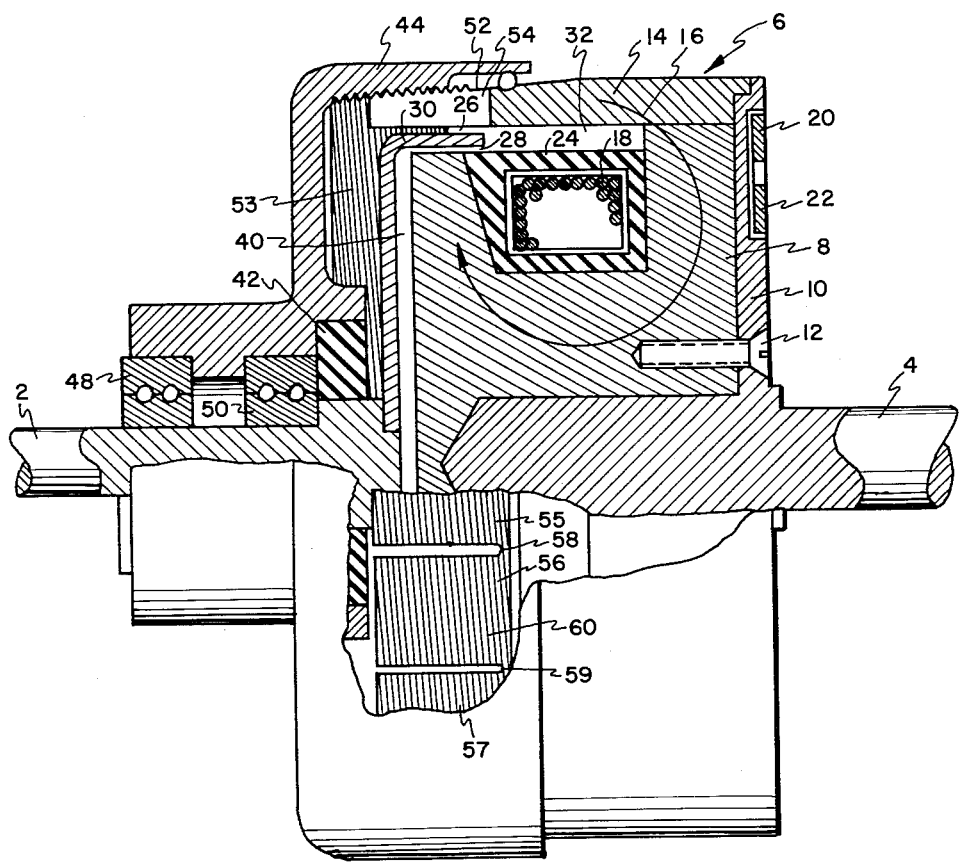

Other objects of this invention will become apparent in connection with the following description when taken together with the accompanying drawings in which:

FIG. 1 is a side view, partially in section and partially in profile, of a first embodiment of the clutch of this invention; and FIG. 2 is a side view, partially in section and partially in profile, of a second embodiment of this invention.

Referring now to FIG. 1, shaft 1 is substantially coaxial with and rotatable relative to shaft 3. Ferromagnetic spool 7, flange or hub 9, screw 11, housing or flux plate 13, and screw means 43 are attached symmetrically to shaft 13 about its axis to form clutch member 5. Spool 7 is a magnetic core which, together with flux plate 13 forms a flux path. Housing 13 is a flux plate of ferromagnetic material adapted to guide flux lines in the path shown by arrow 75. Flux plate 13 is attached at one end to the end of spool 7 which is adjacent shaft 3 and is spaced apart from spool 7 on its second end at the position of working gaps 25 and 27 to form a contoured, beveled slot which is symmetrical about the axes of rotation of shafts 1 and 3. The end of flux plate 13 which is adjacent to screw means 43 has screw threads thereon which are adapted to receive the screw threads on the outer periphery of spacing means 43. Wound around the axis of spool 7 is a coil 17 of electrical conductors which, when supplied by electrical current, generates a magnetic flux in the flux path shown by arrow 75. Coil 17 is electrically connected to slip rings 19 and 21 to receive electrical current therefrom. Coil 17 is usually surrounded by an insulating and sealing material 23, such as a potting compound.

A second ferromagnetic clutch member 29 is attached to shaft 1 for rotation therewith. Clutch member 29 extends radially from shaft 1 to the slot defined by working gaps 25 and 27. Clutch member 29 then extends axially into the slot defined by working gaps 25 and 27. The contour of clutch member 29 is complementary to the contour of spool 7 and flux plate 13 in the region of working gaps 25 and 27. A concentrated magnetic field is generated within gaps 25 and 27 and within clutch member 29.

Gaps 25 and 27 are filled with a ferromagnetic particle powder which is adapted to form chains to carry torque by friction between clutch member 5 and clutch member 29.

Clutch member 5, then, has a gap 31 which is symmetrically disposed about the axis of shaft 3 in the general shape of a right circular cylinder. Clutch member 29 is adapted to be axially adjusted in gap 31 to vary the torque characteristics of the clutch.

In the clutch region, defined by gaps 25 and 27, clutch members 5 and 29 are tapered (as shown more particularly by numerals 33, 35, 37 and 39). It is to be noted that the taper is axially directed from left to right in the figure.

The magnetic particles are maintained within the clutch region by means of seal 41.

Relative axially directed motion between shafts 1 and 3 causes gaps 25 and 27 to vary in length to thereby change the torque vs. exciting current characteristic of the clutch by causing a larger or smaller amount of flux to pass through gaps 25 and 27.

Shaft 1 and clutch member 29 are centered and positioned substantially co-axial with the axis of rotation of shaft 3 by means of a centering member 43 which has threads on the outer periphery thereof adapted to screw into threads 45 on flux plate 13. It is to be noted that member 43 rotates with flux plate 13. Relative axial movement between member 43 and clutch plate 13 causes axial movement of shaft 1 and of clutch member 29 relative to clutch member 5 thereby to vary gaps 25 and 27 to change the torque vs. exciting current characteristic of the clutch.

Shoulder 47 and bearing plate 49 are adapted to engage bearing 51 to thereby axially move bearing 51, shaft 1, and clutch member 29. When screw means 43 is unscrewed, shoulder 47 engages bearing 51, but when screw means 43 is screwed inward, bearing plate 49 engages bearing 51 to move bearing 51 to the right. Clutch member 29 and shaft 1 move axially with bearing 51.

In FIG. 2, shaft 2 and shaft 4 are substantially co-axial with each other. Ferromagnetic spool 8, flange or hub 10, screw 12, housing or flux plate 14, and screw means 44 are attached symmetrically to shaft 4 about its axis to form clutch member 6. Flux plate 14 is of ferromagnetic material adapted to guide flux lines in the path shown by arrow 16. Wound around the axis of spool 8 is a coil 18 of electrical conductors which, when supplied by electrical current, generate a magnetic flux in the flux path shown by arrow 16. Coil 18 is electrically connected to slip rings 20 and 22 to receive electrical current therefrom. Coil 18 is usually surrounded by an insulating and sealing material 24, such as a potting compound. A concentrated magnetic field is generated within gaps 26 and 28 and within clutch member 30, which is of ferromagnetic material and which is attached to rotate with shaft 2.

Gaps 26 and 28 are filled with a ferromagnetic particle powder which is adapted to form chains to carry torque by friction between clutch member 6 and clutch member 30.

Clutch member 6, then, has a gap 32 which is symmetrically disposed about the axis of shaft 4 in the general shape of a right circular cylinder.

In the clutch region, clutch plate 14 has a plurality of ferromagnetic cantilevered springs, such as 54, 55, 56, and 57, symmetrically disposed about the axes of rotation of shafts 2 and 4, separated by axially directed slots shown (for example) at 58 and 59. Cantilevered springs, such as spring 54, are flexible to move to narrow or widen gap 26, and are normally biased to an open position adapted to be forced into a closed position by screw means 44, described more particularly hereinafter.

Screw means 44 engages threads on the axial springs, such as the thread designated at 60 on cantilevered spring 56.

The magnetic particles are maintained within the clutch region by means of seal 42.

Screw means 44, by means of threads 53 on the inner surface thereof, engages the threads on the cantilevered springs, such as the threads 60 on spring 56. It is to be noted that the outer surface of the cantilevered springs are inclined relative to the axes of the shafts. The inner surface of screw means 44 is also inclined to engage the threads on the outer surface of the cantilevered springs. This inclination is shown more particularly at 52.

Screw means 44 is mounted upon bearings 48 and 50 for rotation relative to shaft 2. Axial motion of screw means 44 forces bearings 48 and 50 to push axially against shaft 2 to thereby axially move clutch member 30. Clearance for the motion of clutch member 30 is provided at 40.

In operation, when coils 17 or 18 are energized, magnetic flux is created which causes shafts 1 and 3 or shafts 2 and 4 to be clutch-connected through friction of the magnetic particles.

In FIG. 1, as screw means 43 is screwed in and out, shoulder 47 or bearing plate 49 forces bearing 51, shaft 1 and clutch member 29 to move axially to the right or left to thereby vary the lengths of gaps 25 and 27. When the lengths of gaps 25 and 27 are varied, the torque vs. exciting current characteristic of the clutch is also varied.

In FIG. 2, when screw means 44 is moved to the right, cantilevered springs, such as springs 54, 55, 56 and 57 are forced toward the axes of shafts 2 and 4 to narrow gap 26 to thereby vary the torque vs. exciting current characteristic of the clutch. When screw means 44 is screwed to the left, the bias of the cantilevered springs, such as cantilevered springs 54, 55, 56 and 57, causes them to move radially outward away from the axes of the shafts 2 and 4 to open gap 26, to thereby vary the torque vs. exciting current characteristic of the clutch.

When the respective gap lengths of the clutch of this invention are lengthened, the torque vs. exciting current characteristic of the clutch is decreased. Conversely, when the gap lengths of the clutch of this invention are shortened, the torque vs. exciting current characteristic of the clutch increases.

The device of this invention, therefore, is a magnetic particle clutch which is designed to be adjusted to generate a specific value of torque for a predetermined value of exciting current.

The device of this invention also provides a magnetic particle clutch which is adapted to be adjusted for compensation of manufacturing tolerances.

The clutch of this invention is likewise well adapted to be utilized as a servo element which will consistently maintain a predetermined transfer function over a long period of time.

It is not intended that the above description shall in any way limit this invention, but shall only be demonstrative thereof and that the invention shall be limited only in accordance with the description set forth in the following claim:

I claim:

In combination: a first shaft member; a second shaft member, substantially coaxial with and rotatable relative to said first shaft member; a ferromagnetic spool attached to said first shaft member for symmetrical rotation about the axis of said first shaft member, said spool having a first end and a second end, said first shaft extending from said first end of said spool, said spool having a portion of its peripheral surface bevelled at its second end whereby the outside diameter of said spool is increased with increasing distance from said second end over the length of said bevelled portion; a coil of electrical conductors, adapted to receive electrical current, wound around said spool; a pair of slip rings connected to said coil to carry electrical current thereto; a flux plate member of ferromagnetic material symmetrical about the axes of said shafts and attached by its first end to said first end of said spool and spaced apart from said spool at its second end to form an annular slot symmetrically disposed about the axes of rotation of said shafts, said flux plate having a portion of its inner surface adjacent its second end bevelled to provide an increasing internal diameter of said flux plate with increasing distance from said second end over the length of said second mentioned bevelled portion, the second end of said flux plate having screw threads on the inner periphery thereof; a second ferromagnetic clutch member attached to said second shaft for rotation therewith; said second clutch member having a first part extending radially from said second shaft to said slot and a second part extending axially into said slot, said second part being a continuation of said first part, said second part having surfaces contoured to complement the bevelled surfaces of said spool and of said flux plate; said second clutch member being positioned so as to provide for annular spaces between said second portion of said second clutch member and said bevelled surface of said spool, and between said second portion of said clutch member and said bevelled surface of said flux plate; a centering member having threads on the outer periphery thereof, adapted to engage said first mentioned threads and having bearing means symmetrical about the axis thereof adapted to receive said second shaft member and including bearing means to support said second shaft member in centered relation relative to said slot, said centering member having shoulders adapted to engage said second shaft and to move said second shaft in response to the axial position of said screw member and axially to move the contoured surfaces of said second clutch member relative to said bevelled surfaces of said spool and said flux plate.

References Cited in the file of this patent

UNITED STATES PATENTS

| | | |
|---|---|---|
| 2,575,360 | Rabinow | Nov. 20, 1951 |
| 2,772,761 | Janson | Dec. 4, 1956 |
| 2,809,733 | Perry | Oct. 15, 1957 |
| 2,815,106 | Leff et al. | Dec. 3, 1957 |
| 2,886,151 | Winslow | May 12, 1959 |
| 2,921,657 | Winther | Jan. 19, 1960 |

FOREIGN PATENTS

| | | |
|---|---|---|
| 802,774 | Great Britain | Oct. 8, 1958 |

OTHER REFERENCES

Technical Report 1213, National Bureau of Standards, Washington, D.C.; copy received in Division 68, U.S. Patent Office on March 30, 1948.